(12) United States Patent
Okubo et al.

(10) Patent No.: US 9,902,358 B2
(45) Date of Patent: Feb. 27, 2018

(54) WEBBING DEVICE

(71) Applicant: KABUSHIKI KAISHA TOKAI-RIKA-DENKI-SEISAKUSHO, Aichi (JP)

(72) Inventors: Shinichi Okubo, Aichi (JP); Masaru Ukita, Aichi (JP); Tomonari Umakoshi, Aichi (JP); Haruhiko Hashimoto, Aichi (JP); Ryu Nakashima, Aichi (JP)

(73) Assignee: KABUSHIKI KAISHA TOKAI-RIKA-DENKI-SEISAKUSHO, Aichi-Ken (JP)

( * ) Notice: Subject to any disclaimer, the term of this patent is extended or adjusted under 35 U.S.C. 154(b) by 0 days.

(21) Appl. No.: 15/314,422

(22) PCT Filed: Apr. 30, 2015

(86) PCT No.: PCT/JP2015/063021
§ 371 (c)(1),
(2) Date: Nov. 28, 2016

(87) PCT Pub. No.: WO2015/186457
PCT Pub. Date: Dec. 10, 2015

(65) Prior Publication Data
US 2017/0190310 A1 Jul. 6, 2017

(30) Foreign Application Priority Data
Jun. 3, 2014 (JP) .................................. 2014-115152

(51) Int. Cl.
*B60R 21/18* (2006.01)
*B60R 21/215* (2011.01)
(Continued)

(52) U.S. Cl.
CPC ............ *B60R 21/18* (2013.01); *B60R 21/215* (2013.01); *B60R 21/231* (2013.01);
(Continued)

(58) Field of Classification Search
CPC ..... B60R 21/18; B60R 21/262; B60R 21/276; B60R 21/233; B60R 21/264; B60R 22/14;
(Continued)

(56) References Cited

U.S. PATENT DOCUMENTS 6,142,511 A * 11/2000 Lewis ..................... B60R 21/18
280/733
6,340,173 B1 * 1/2002 Specht .................... B60R 21/18
280/733
(Continued)

FOREIGN PATENT DOCUMENTS

JP 2008247087 A * 10/2008 ............. B60R 21/18

*Primary Examiner* — Drew J Brown
(74) *Attorney, Agent, or Firm* — Roberts Mlotkowski Safran Cole & Calderon P.C.

(57) ABSTRACT

In a seatbelt device, at a time of an emergency of a vehicle, gas is supplied into a tube, and gas within the tube is supplied into a chest bag of a bag, and the chest bag is inflated and expanded. Here, at a time when gas is supplied into the tube, due to the tube being inflated between a webbing and a lower side peripheral surface of an insert-through hole of a tongue, a transverse direction other side portion of the bag is crushed by the tube, and gas that is within the chest bag passing via the transverse direction other side portion of the bag into a waist bag of the bag is limited. Therefore, the chest bag can be inflated and expanded at an early stage.

6 Claims, 7 Drawing Sheets

(51) Int. Cl.
*B60R 21/231* (2011.01)
*B60R 21/235* (2006.01)
*B60R 21/237* (2006.01)
*B60R 21/239* (2006.01)
*B60R 21/262* (2011.01)
*B60R 21/264* (2006.01)
*B60R 21/233* (2006.01)
*B60R 21/276* (2006.01)
*B60R 22/14* (2006.01)

(52) U.S. Cl.
CPC .......... *B60R 21/233* (2013.01); *B60R 21/235* (2013.01); *B60R 21/237* (2013.01); *B60R 21/239* (2013.01); *B60R 21/262* (2013.01); *B60R 21/264* (2013.01); *B60R 21/276* (2013.01); *B60R 22/14* (2013.01); *B60R 2021/2358* (2013.01); *B60R 2021/23107* (2013.01); *B60R 2021/23509* (2013.01); *B60R 2021/23542* (2013.01); *B60R 2021/23576* (2013.01)

(58) Field of Classification Search
CPC ... B60R 21/239; B60R 21/237; B60R 21/235; B60R 21/231; B60R 21/215; B60R 2021/23542; B60R 2021/23509; B60R 2021/23107; B60R 2021/23576; B60R 2021/2358

See application file for complete search history.

(56) References Cited

U.S. PATENT DOCUMENTS

| | | | | |
|---|---|---|---|---|
| 6,471,243 | B1* | 10/2002 | Brown | B60R 21/18 280/733 |
| 7,883,106 | B2* | 2/2011 | Mical | B60R 21/18 280/733 |
| 9,561,771 | B2* | 2/2017 | Okubo | B60R 21/18 |
| 2003/0015863 | A1* | 1/2003 | Brown | A44B 11/2503 280/733 |
| 2003/0168837 | A1* | 9/2003 | Schneider | B60R 21/18 280/733 |
| 2007/0001435 | A1* | 1/2007 | Gray | B60R 21/18 280/733 |
| 2007/0102909 | A1* | 5/2007 | Nezaki | B60R 21/18 280/733 |
| 2009/0236828 | A1* | 9/2009 | Foubert | B60R 21/18 280/728.2 |
| 2013/0134695 | A1 | 5/2013 | Burczyk | |

* cited by examiner

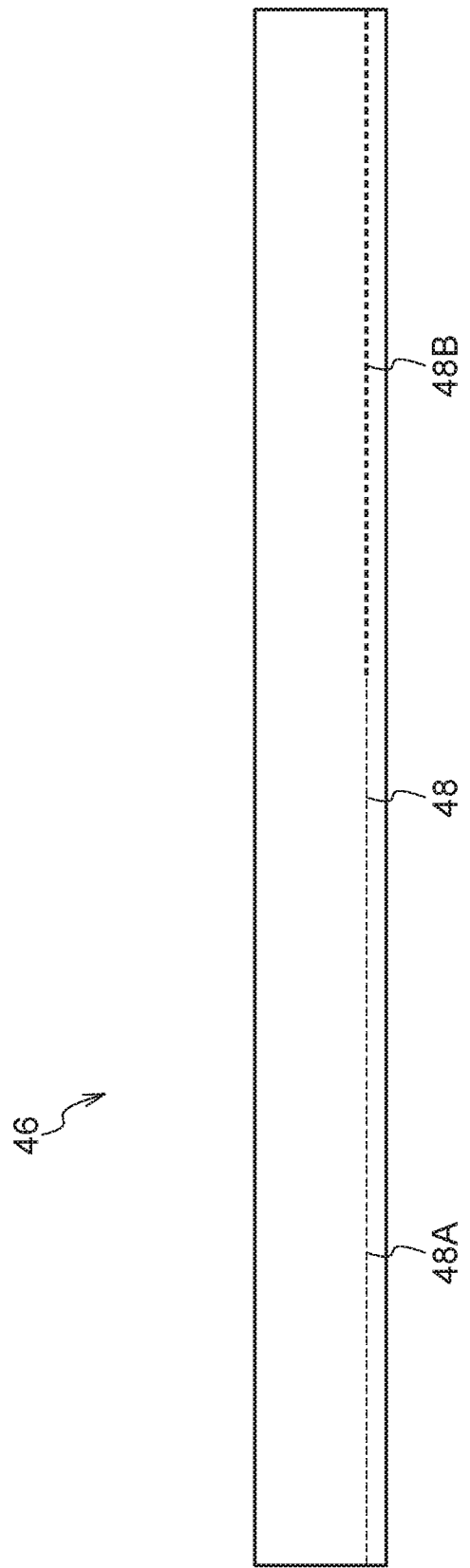

WEBBING DEVICE

CROSS-REFERENCE TO RELATED APPLICATIONS

The present application is a U.S. National Phase of PCT/JP2015/063021 filed on Apr. 30, 2015 claiming priority to Japanese Patent application No. 2014-115152 filed Jun. 3, 2014. The disclosure of the PCT Application is hereby incorporated by reference into the present Application.

TECHNICAL FIELD

The present invention relates to a webbing device in which a bag body is provided at a webbing that is applied to a passenger of a vehicle.

BACKGROUND ART

In the vehicle safety belt of US Patent Application Publication No. 2013/0134695, a tube is provided within a belt webbing, gas is supplied into the tube, the gas that has been supplied into the tube is supplied into the belt webbing, and the belt webbing is inflated.

Here, in such a vehicle safety belt, it is preferable that, for example, the shoulder belt region of the belt webbing be inflated at an early stage.

SUMMARY OF INVENTION

Technical Problem

In view of the above-described circumstances, an object of the present invention is to provide a webbing device that can inflate a inflating portion of a bag body at an early stage at one side of an insert-through member.

Solution to Problem

A webbing device of a first aspect of the present invention comprises: a bag body that is provided at a webbing that is applied to a passenger of a vehicle, and at which are provided a supplying portion into which a fluid is supplied and an inflating portion into which the fluid, that was supplied into the supplying portion, is supplied and that is inflated; and an insert-through member, in which is provided an insert-through hole through which the bag body is inserted, wherein the bag body is disposed at one side and at another side of the insert-through member, the insert-through member supports the bag body at one side peripheral surface of the through-hole, the fluid, that has been supplied into the supplying portion, is supplied into the inflating portion at the one side of the insert-through member, and due to the fluid being supplied into the supplying portion and the supplying portion being inflated, the inflating portion is crushed between the supplying portion and another side peripheral surface of the insert-through hole, and passage of the fluid, that is within the inflating portion, from the one side toward the other side of the insert-through member, is limited.

In a webbing device of a second aspect of the present invention, in the webbing device of the first aspect of the present invention, the supplying portion is configured to contract after supplying of fluid into the supplying portion has ended.

In a webbing device of a third aspect of the present invention, in the webbing device of the first aspect or the second aspect of the present invention, the supplying portion is disposed at another side of the webbing, and the inflating portion is disposed at one side of the webbing and another side of the supplying portion.

In a webbing device of a fourth aspect of the present invention, the webbing device of any one of the first aspect through the third aspect of the present invention comprises a discharge hole that is provided at the inflating portion at the other side of the insert-through member, and that is configured to discharge fluid that is within the inflating portion.

In a webbing device of a fifth aspect of the present invention, in the webbing device of the fourth aspect of the present invention, a webbing transverse direction dimension of the supplying portion is larger than a webbing transverse direction dimension of the discharge hole.

In a webbing device of a sixth aspect of the present invention, the webbing device of any one of the first aspect through the fifth aspect of the present invention comprises a covering member that covers the bag body, and at which rupturing due to inflation of the bag body is limited at the other side of the insert-through member.

Advantageous Effects of Invention

In the webbing device of the first aspect of the present invention, the bag body is provided at the webbing that is applied to the passenger of the vehicle. The fluid is supplied into the supplying portion of the bag body, and the fluid, that has been supplied into the supplying portion, is supplied into the inflating portion of the bag body, and the inflating portion is inflated. Further, the bag body is inserted-through the insert-through hole of the insert-through member, and the bag body is disposed at the one side and the other side of the insert-through member, and the insert-through member supports the bag body at the one side peripheral surface of the insert-through hole.

By the way, the fluid, that has been supplied into the supplying portion, is supplied into the inflating portion at the one side of the insert-through member.

Here, due to the fluid being supplied to the interior of the supplying portion and the supplying portion being inflated, the inflating portion is crushed between the supplying portion and the other side peripheral surface of the insert-through hole, and passage of the fluid, that is within the inflating portion, from the one side toward the other side of the insert-through member, is limited. Therefore, the inflating portion can be inflated at an early stage at the one side of the insert-through member.

In the webbing device of the second aspect of the present invention, after the supplying of the fluid into the supplying portion has ended, the supplying portion is configured to contract. Therefore, passage of the fluid, that is within the inflating portion, from the one side toward the other side of the insert-through member, can be permitted.

In the webbing device of the third aspect of the present invention, the supplying portion is disposed at the other side of the webbing, and the inflating portion is disposed at the other side of the supplying portion. Therefore, due to the supplying portion being inflated, the inflating portion at the other side of the supplying portion can be effectively crushed between the supplying portion and the other side peripheral surface of the insert-through hole.

Moreover, the inflating portion is disposed at the one side of the webbing. Therefore, due to the insert-through member supporting the bag body and the webbing at the one side peripheral surface of the insert-through hole, the inflating portion at the one side of the webbing can be crushed between the webbing and the one side peripheral surface of the insert-through hole, and passage of the fluid, that is within the inflating portion at the one side of the webbing, from the one side toward the other side of the insert-through member, can be limited In the webbing device of the fourth aspect of the present invention, the discharge hole is provided at the inflating portion at the other side of the insert-through member, and the discharge hole is configured to discharge the fluid that is within the inflating portion. Therefore, the inflating portion inflating at the other side of the insert-through member can be suppressed.

In the webbing device of the fifth aspect of the present invention, the webbing transverse direction dimension of the supplying portion is larger than the webbing transverse direction dimension of the discharge hole. Therefore, fluid can be supplied effectively via the supplying portion interior to the inflating portion interior.

In the webbing device of the sixth aspect of the present invention, the covering member covers the bag body, and rupturing of the covering member due to inflation of the bag body is limited at the other side of the insert-through member. Therefore, inflation of the bag body can be limited by the covering member at the other side of the insert-through member.

BRIEF DESCRIPTION OF DRAWINGS

FIG. 7 is a plan view showing a state in which an obverse and a reverse of a cover of the seatbelt device relating to the embodiment of the present invention are reversed.

DESCRIPTION OF EMBODIMENTS

Figure 1:
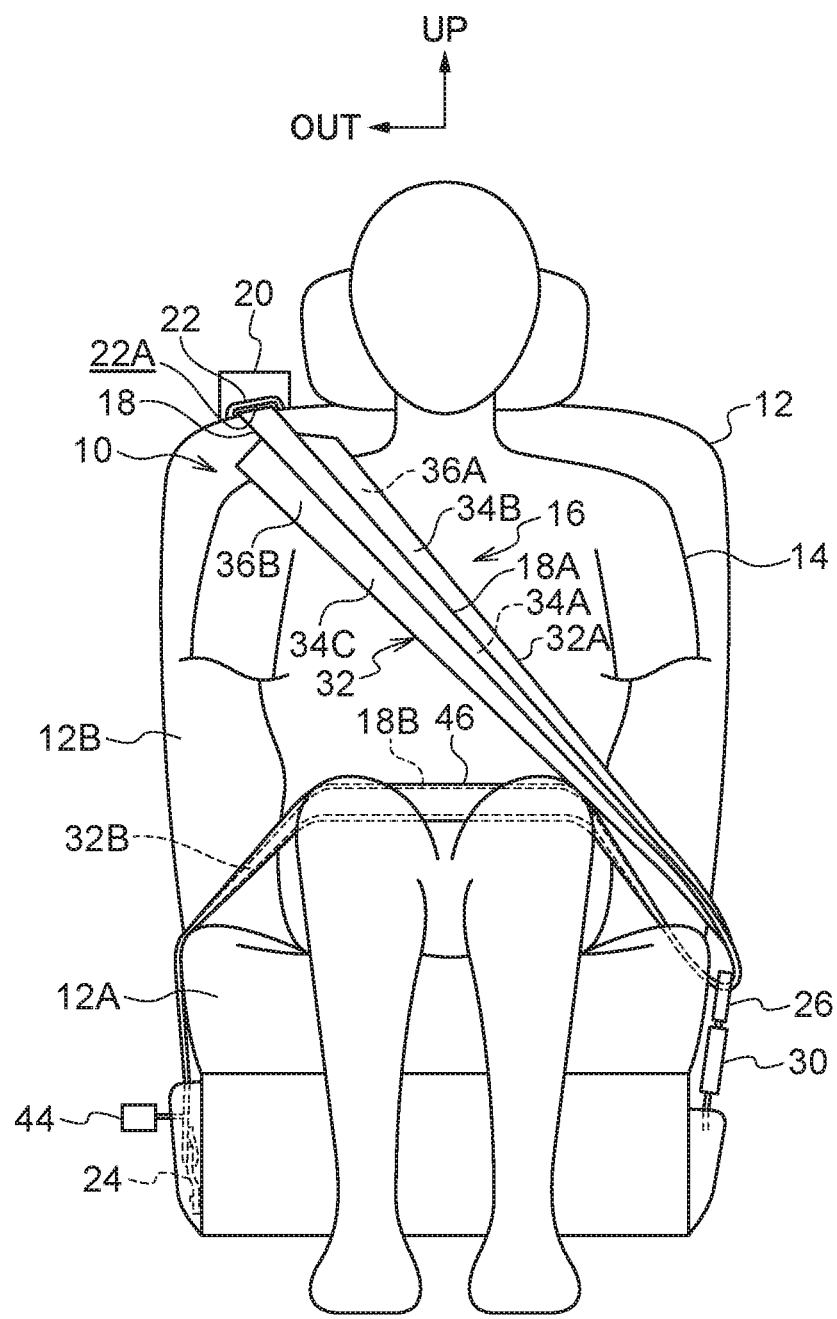
FIG. 1 is a front view showing a time of operation of an air belt of a seatbelt device relating to an embodiment of the present invention.
Figure 2:
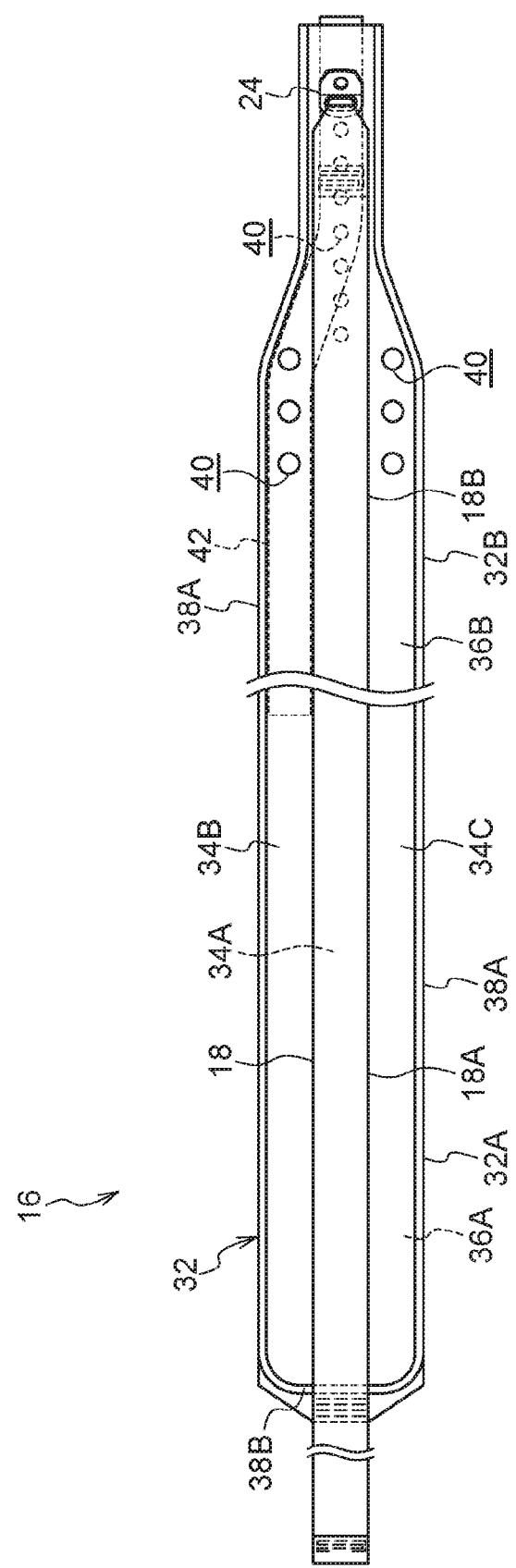
FIG. 2 is an expanded plan view showing main portions of the air belt of the seatbelt device relating to the embodiment of the present invention.
Figure 3:
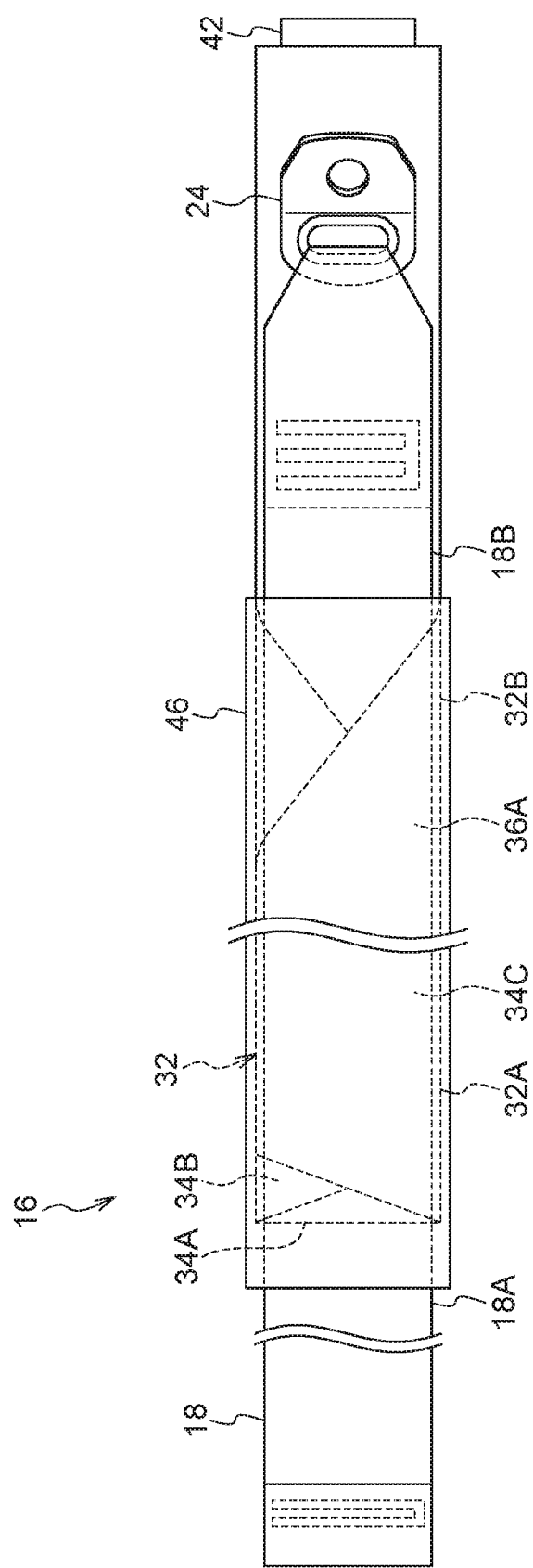
FIG. 3 is a plan view showing the air belt of the seatbelt device relating to the embodiment of the present invention.

A seatbelt device 10, that relates to an embodiment and to which a webbing device of the present invention is applied, is shown in a front view in FIG. 1. Note that, in FIG. 1, the vehicle transverse direction outer side (vehicle right side) is indicated by arrow OUT, and the upper side is indicated by arrow UP.

As shown in FIG. 1, the seatbelt device 10 relating to the present embodiment is provided at a seat 12 of a vehicle, and the front, the right and the top of the seat 12 are directed toward the front, the right and the top of the vehicle, respectively. A seat cushion 12A is provided at the lower portion of the seat 12, and a seatback 12B is provided at the rear portion of the seat 12. A passenger 14 of the vehicle can sit in the seat 12.

The seatbelt device 10 has an air belt 16 that is substantially shaped as an elongated strip and serves as a webbing body. A webbing 18 (a belt) that is shaped as an elongated strip is provided at the air belt 16 along the length direction thereof.

The webbing 18 is, from the length direction base end side thereof, taken-up and stored by a take-up device 20 that serves as a storage means. The take-up device 20 is fixed to the vehicle body (or the seat 12) at the vehicle rear side of the vehicle transverse direction outer side portion and the upper portion of the seat 12, and the webbing 18 is pulled-out toward the vehicle front side. A lock mechanism (not shown) is provided at the take-up device 20. At the time of an emergency of the vehicle (a predetermined occasion such as at the time of a collision (the time of sudden pulling-out of the webbing 18 from the take-up device 20 or the time of a rapid deceleration of the vehicle) or the like), the lock mechanism is operated, and pulling-out of the webbing 18 from the take-up device 20 is locked.

A shoulder anchor 22 that serves as an upper supporting portion is fixed to the vehicle body (or the seat 12) at the vehicle rear side of the vehicle transverse direction outer side portion and the upper portion of the seat 12. An insert-through hole 22A that is shaped as an elongated rectangle is formed so as to pass-through the shoulder anchor 22. The portion, that is further toward the length direction distal end side than the take-up device 20, of the webbing 18, is inserted-through the insert-through hole 22A of the shoulder anchor 22 so as to be able to move in the length direction, and the webbing 18 is supported in a state of being folded-over at the lower side peripheral surface of the insert-through hole 22A of the shoulder anchor 22 (the peripheral surface at the passenger 14 side).

The length direction distal end of the webbing 18 is supported at an anchor 24 that serves as an outer supporting portion. The anchor 24 is fixed to the vehicle body (or the seat 12) at the vehicle transverse direction outer side and the lower side of the rear portion of the seat 12.

Figure 4:
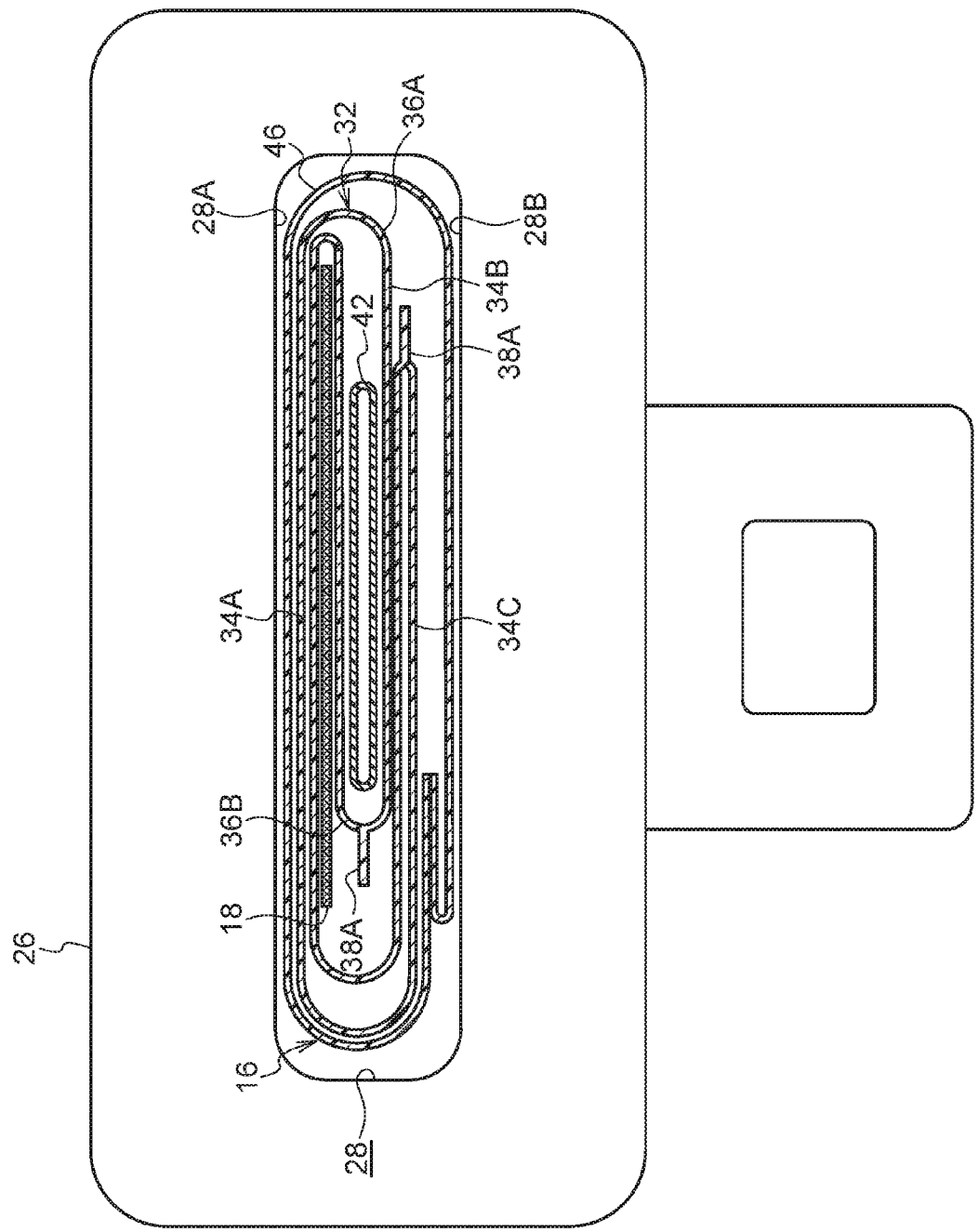
FIG. 4 is a cross-sectional view at a tongue position, that shows the air belt of the seatbelt device relating to the embodiment of the present invention.

A tongue 26 (see FIG. 4) that serves as an insert-through member (an attachment portion) is provided at the portion, that is between the shoulder anchor 22 and the anchor 24, of the webbing 18. An insert-through hole 28 that is shaped as an elongated rectangle is formed so as to pass-through the tongue 26, and the webbing 18 is inserted-through the insert-through hole 28 so as to be able to move in the length direction. Further, a buckle 30 that serves as an inner supporting portion is fixed to the vehicle body (or the seat 12) at the vehicle transverse direction inner side and the lower side of the rear portion of the seat 12.

The tongue 26 is made to be detachable with respect to the buckle 30. Due to the webbing 18 being pulled-out from the take-up device 20 and the tongue 26 being attached to the buckle 30, the webbing 18 is applied from the front side to the passenger 14 who is seated in the seat 12. Due thereto, due to the webbing 18 being supported in a state of being folded-over at an upper side peripheral surface 28A (the peripheral surface at the passenger 14 side, the one side peripheral surface) of the insert-through hole 28 of the tongue 26, the portion, that is between the shoulder anchor 22 and the tongue 26 (the portion at one side of the tongue 26), of the webbing 18 is a shoulder webbing 18A (a shoulder belt) and is applied in an oblique direction to the shoulder portion and the chest portion and the like of the passenger 14, and the portion, that is between the tongue 26 and the anchor 24 (the portion at the other side of the tongue 26), of the webbing 18 is a lap webbing 18B (a lap belt) and is applied in the lateral direction to the waist region of the passenger 14. Further, the webbing 18 is apart from a lower side peripheral surface 28B (the peripheral surface at the side opposite the passenger 14, the other side peripheral surface) of the insert-through hole 28 of the tongue 26.

As shown in FIG. 1 through FIG. 4, a bag 32, that is shaped as an elongated bag and serves as an inflating portion that structures a bag body, is provided at the air belt 16 along the length direction thereof. The bag 32 is disposed at the range from the shoulder webbing 18A to the lap webbing 18B of the webbing 18, and, together with the webbing 18, is inserted-through the insert-through hole 28 of the tongue 26 so as to be able to move in the length direction. The portion, that is at the position of the shoulder webbing 18A, of the bag 32 is a chest bag 32A (a first bag) that serves as one side portion, and the portion, that is at the position of the lap webbing 18B, of the bag 32 is a waist bag 32B (a second bag) that serves as an other side portion.

The bag 32 is a shape that is symmetrical with respect to a transverse direction central line thereof, and the transverse direction central line of the bag 32 is disposed along the transverse direction central line of the webbing 18. The transverse direction dimension of the bag 32 is larger than the transverse direction dimension of the webbing 18. A transverse direction central portion 34A (a facing portion) of the bag 32 faces the webbing 18 in the thickness direction of the webbing 18. A transverse direction one side portion 34B (inner side portion, upper side portion) and a transverse direction other side portion 34C (outer side portion, lower side portion) of the bag 32 extend-out toward the transverse direction outer sides of the webbing 18.

The transverse direction central portion 34A of the bag 32 is disposed at a thickness direction one side of the webbing 18, and the transverse direction central portion 34A of the bag 32 is disposed between the webbing 18 and the upper side peripheral surface 28A of the insert-through hole 28 of the tongue 26. The transverse direction one side portion 34B, other than at the anchor 24 peripheral portion, of the bag 32 is folded-onto the thickness direction other side of the webbing 18. The transverse direction one side portion 34B of the bag 32 is disposed between the webbing 18 and the lower side peripheral surface 28B of the insert-through hole 28 of the tongue 26. The transverse direction other side portion 34C, other than at the anchor 24 peripheral portion, of the bag 32 is folded-onto the thickness direction other side of the webbing 18 at the side of the transverse direction one side portion 34B of the bag 32 that is opposite the webbing 18. The transverse direction other side portion 34C of the bag 32 is disposed between the transverse direction one side portion 34B of the bag 32 and the lower side peripheral surface 28B of the insert-through hole 28 of the tongue 26. At the time when the webbing 18 is applied to the passenger 14, due to the bag 32 being supported, together with the webbing 18, in a state of being folded-over at the upper side peripheral surface 28A of the insert-through hole 28 of the tongue 26, the transverse direction central portion 34A of the bag 32 is disposed at the passenger 14 side of the webbing 18 at the chest bag 32A, and is disposed at the side opposite the passenger 14 of the webbing 18 at the waist bag 32B.

The bag 32 is formed in the shape of a bag by so-called hollow weaving. An obverse layer 36A, that is shaped as an elongated strip and serves as a first layer at the side opposite the webbing 18, and a reverse layer 36B, that is shaped as an elongated strip and serves as a second layer at the webbing 18 side, are provided at the bag 32. Side joining portions 38A and an end joining portion 38B are formed at entire of the transverse direction both ends and the vicinity of the length direction base end portion (the end portion at the length direction base end side of the webbing 18) of the bag 32, respectively. The side joining portions 38A and the end joining portion 38B are formed by so-called single-layer fabrics, and the obverse layer 36A and the reverse layer 36B are joined (are made integral). Due thereto, the interior (between the obverse layer 36A and the reverse layer 36B) of the bag 32 is open at the length direction distal end (the end at the length direction distal end side of the webbing 18). Further, the bag 32 is joined to the webbing 18 by sewing or adhesion or the like at appropriate positions.

Plural vent holes 40 that are circular and serve as discharge holes are formed in the bag 32 (the waist bag 32B) so as to pass-through the transverse direction central portion 34A, the transverse direction one side portion 34B and the transverse direction other side portion 34C respectively, in a vicinity of the length direction distal end portion. The diameter of the vent holes 40 at the transverse direction one side portion 34B and the transverse direction other side portion 34C of the bag 32 are larger than the vent holes 40 at the transverse direction central portion 34A of the bag 32.

A tube 42 that is tubular and serves as a supplying portion is provided at the air belt 16 along the length direction. The tube 42 is structured of a fabric, and is flexible. The tube 42 is inserted into the bag 32 from the length direction distal end (the open end) of the bag 32, and the length direction distal end (the end at the length direction distal end side of the webbing 18) of the tube 42 extends-out from the length direction distal end of the bag 32. At the anchor 24 peripheral portion, the tube 42 is disposed within the transverse direction central portion 34A of the bag 32, and, at the portion other than the anchor 24 periphery, the tube 42 is disposed within the transverse direction one side portion 34B of the bag 32. The length direction base end portion of the tube 42 (the end portion at the length direction base end side of the webbing 18) is, together with the webbing 18 and the bag 32, inserted-through the insert-through hole 28 of the tongue 26 so as to be able to move in the length direction. The length direction base end of the tube 42 is disposed within the chest bag 32A. Further, the maximum width dimension of the tube 42 (the maximum diameter dimension in the maximum crushed state of the tube 42) is larger than the diameter dimension (the bag 32 transverse direction dimension) of the largest vent holes 40 of the bag 32 (the vent holes 40 at the transverse direction one side portion 34B and the transverse direction other side portion 34C).

An inflator 44 (see FIG. 1) that serves as a supplying means communicates with the interior of the length direction distal end of the tube 42. Due to the inflator 44 instantaneously generating high-pressure gas that serves as a fluid and supplying the gas to the tube 42 interior at the time of an emergency of the vehicle (a predetermined occasion such as a time of sensing of a collision, or the like), the tube 42 is inflated by this gas. Moreover, due to the gas being supplied via the tube 42 interior to the bag 32 interior, the bag 32 is inflated by this gas.

A cover 46 that is tubular and serves as a covering member is provided at the air belt 16 along the length direction thereof. The cover 46 is flexible. The cover 46 covers (accommodates) the portion, that is other than at the anchor 24 periphery, of the bag 32. The cover 46, together with the webbing 18, the bag 32 and the tube 42, is inserted-through the insert-through hole 28 of the tongue 26 so as to be able to move in the length direction. The cover 46 is manufactured due to the transverse direction both end portions of a fabric that is shaped as an elongated strip being joined along the length direction by a stitched portion 48 (see FIG. 7) that serves as a joining means, and thereafter, the obverse and reverse (the inner peripheral surface and the outer peripheral surface) being reversed. The joining strength of a stitched portion 48B, that is at the waist bag 32B position, of the cover 46 is higher than that of a stitched portion 48A, that is at the chest bag 32A position, of the cover 46. Therefore, at the time when the bag 32 is inflated, the stitched portion 48A, that is at the chest bag 32A position, of the cover 46 is ruptured, and the chest bag 32A is inflated and expanded at the thickness direction one side (the passenger 14 side) of the webbing 18, and, on the other hand, rupturing of the stitched portion 48B, that is at the waist bag 32B position, of the cover 46 is limited (suppressed), and the inflation and expansion of the waist bag 32B is limited (suppressed).

Operation of the present embodiment is described next.

In the seatbelt device 10 of the above-described structure, due to the webbing 18 being pulled-out from the take-up device 20 and the tongue 26 being attached to the buckle 30, the webbing 18 is applied from the front side to the passenger 14 who is seated in the seat 12, and the shoulder webbing 18A of the webbing 18 is applied in an oblique direction to the shoulder portion and the chest portion and the like of the passenger 14, and the lap webbing 18B of the webbing 18 is applied in the lateral direction to the waist region of the passenger 14. Further, the webbing 18 and the bag 32 are supported in a state of being folded-over at the upper side peripheral surface 28A of the insert-through hole 28. The transverse direction central portion 34A of the bag 32, that is at a thickness direction one side of the webbing 18, is disposed at the passenger 14 side of the webbing 18 at the chest bag 32A, and is disposed at the side opposite the passenger 14 of the webbing 18 at the waist bag 32B.

At the time of an emergency of the vehicle (the time of a collision or the like), the lock mechanism of the take-up device 20 is operated, and pulling-out of the webbing 18 from the take-up device 20 is locked. Therefore, the shoulder webbing 18A of the webbing 18 restrains the shoulder portion and the chest portion and the like of the passenger 14, and the lap webbing 18B of the webbing 18 restrains the waist region of the passenger 14.

Further, at the time of an emergency of the vehicle (the time of sensing of a collision, or the like), due to the inflator 44 instantaneously generating high-pressure gas and supplying this gas to the interior of the tube 42, the tube 42 is inflated by this gas. Moreover, due to this gas being supplied from the length direction base end of the tube 42 (the end at the side opposite the inflator 44) to the interior of the chest bag 32A of the bag 32, the chest bag 32A is inflated and expanded at the thickness direction one side (the passenger 14 side) of the webbing 18 while the stitched portion 48A that is at the chest bag 32A position of the cover 46 is ruptured.

Figure 5:
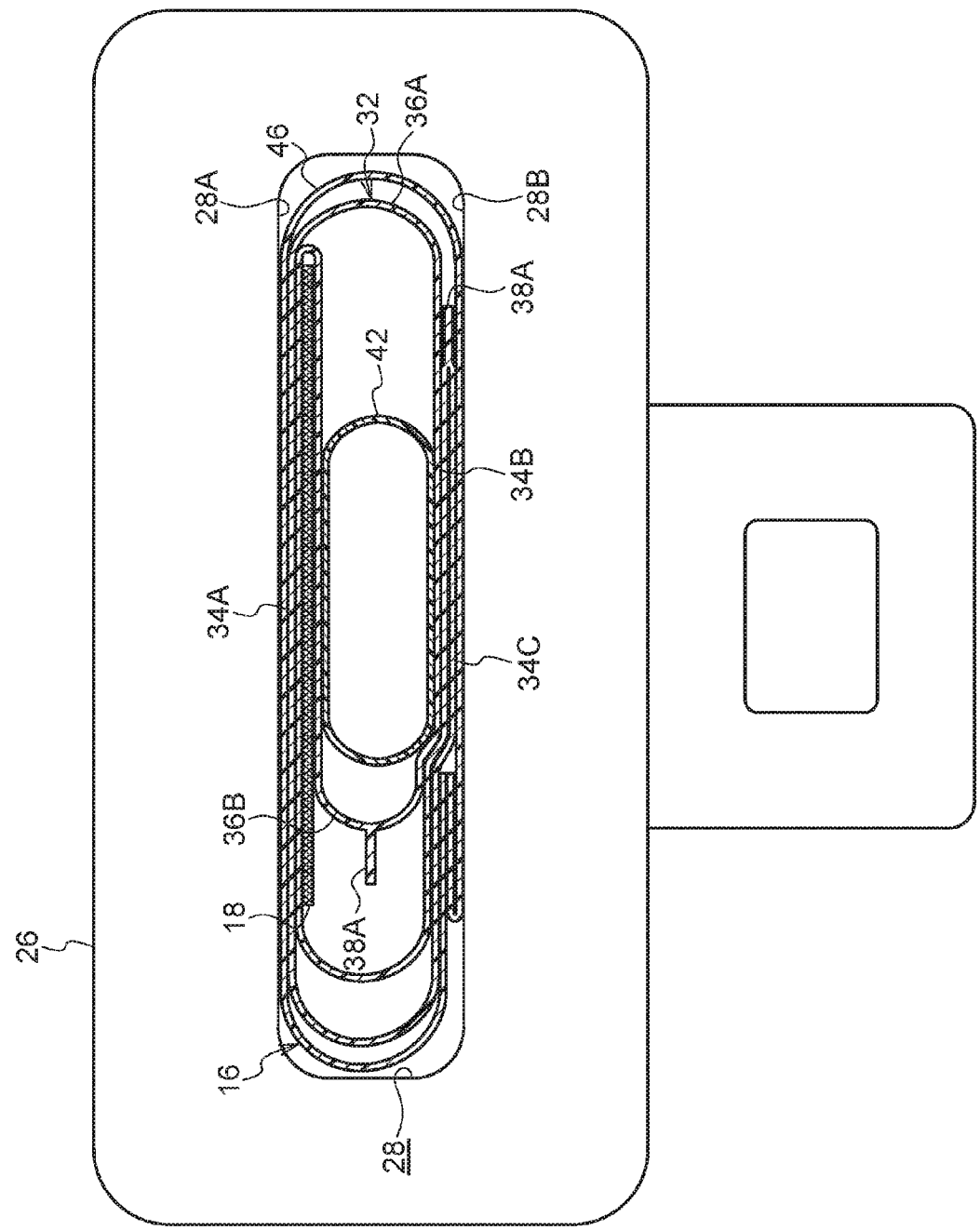
FIG. 5 is a cross-sectional view at the tongue position, that shows an initial stage of operation of the air belt of the seatbelt device relating to the embodiment of the present invention.
Figure 6:
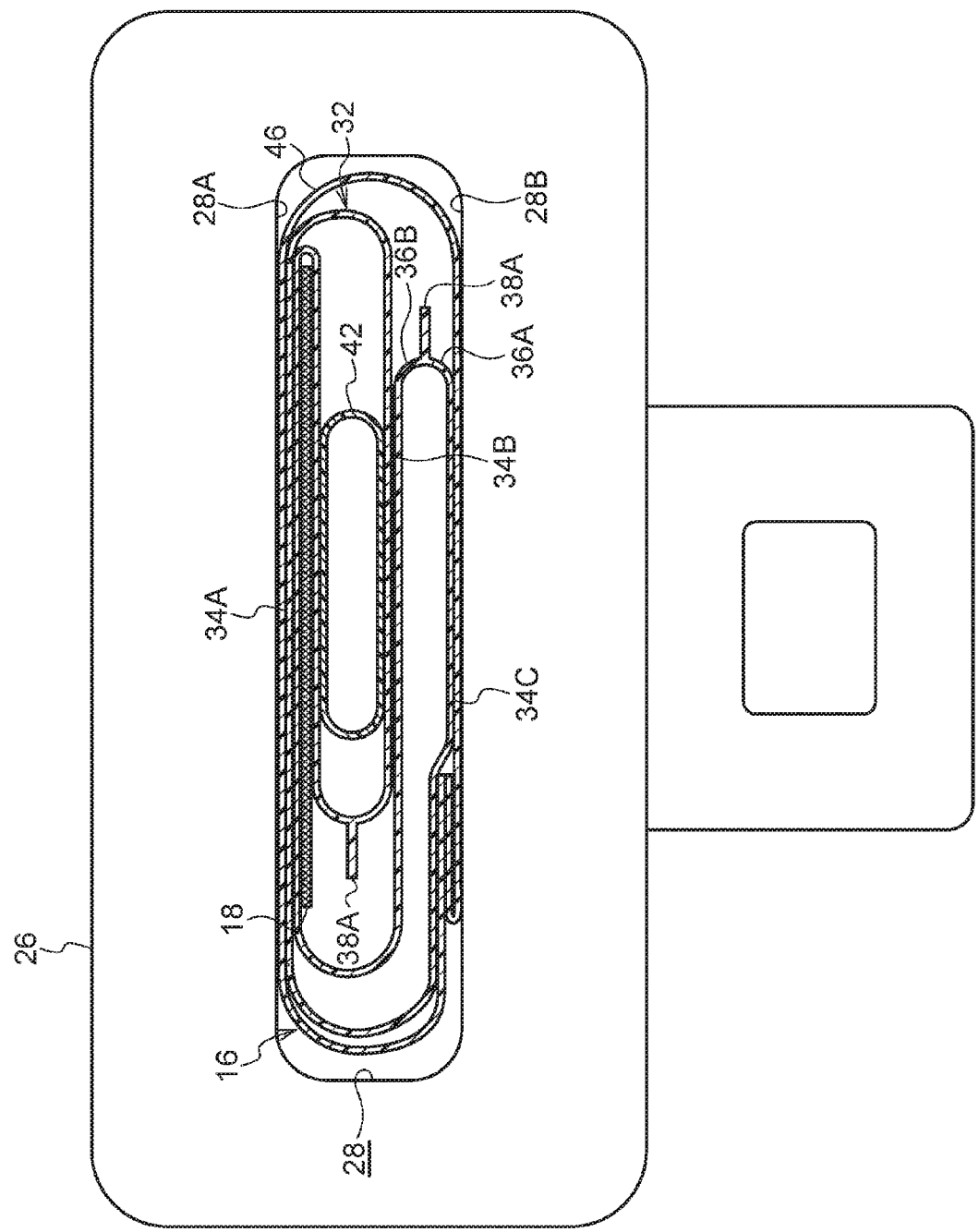
FIG. 6 is a cross-sectional view at the tongue position, that shows a later stage of operation of the air belt at the seatbelt device relating to the embodiment of the present invention.

By the way, as shown in FIG. 5 and FIG. 6, at the time of an emergency of the vehicle, due to load being applied to the webbing 18 from the passenger 14 in a state in which the transverse direction central portion 34A of the bag 32 is disposed between the webbing 18 and the upper side peripheral surface 28A of the insert-through hole 28 of the tongue 26, the transverse direction central portion 34A of the bag 32 is crushed between the webbing 18 and the upper side peripheral surface 28A of the insert-through hole 28 of the tongue 26, and the gas within the chest bag 32A passing via the transverse direction central portion 34A of the bag 32 into the waist bag 32B is limited (suppressed).

Here, as shown in FIG. 5, at the time when gas from the inflator 44 is supplied into the tube 42, due to the tube 42 being inflated by the gas between the webbing 18 and the lower side peripheral surface 28B of the insert-through hole 28 of the tongue 26, the transverse direction other side portion 34C of the bag 32 is crushed by the pressure of the gas at the interior of the tube 42 in a state in which the transverse direction one side portion 34B and the transverse direction other side portion 34C of the bag 32 and the tube 42 are nipped between the webbing 18 and the lower side peripheral surface 28B of the insert-through hole 28 of the tongue 26, and the gas that is within the chest bag 32A passing via the transverse direction other side portion 34C of the bag 32 into the waist bag 32B is limited (suppressed). Therefore, the chest bag 32A can be inflated and expanded at an early stage, and the shoulder portion and the chest portion and the like of the passenger 14 can be received by the chest bag 32A at an early stage, and the performance of restraining the shoulder portion and the chest portion and the like of the passenger 14 by the chest bag 32A can be improved.

Moreover, as shown in FIG. 6, after the supplying of the gas from the inflator 44 into the tube 42 ends, the pressure of the gas within the tube 42 decreases, and the tube 42 is configured to contract, and, due thereto, the transverse direction other side portion 34C of the bag 32 is configured to inflate between the transverse direction one side portion 34B of the bag 32 and the tube 42, and the lower side peripheral surface 28B of the insert-through hole 28 of the tongue 26, and the gas within the chest bag 32A passing via the transverse direction other side portion 34C of the bag 32 into the waist bag 32B is permitted. Therefore, due to the chest bag 32A gradually being contracted by the load from the shoulder portion and the chest portion and the like of the passenger 14 while the gas within the chest bag 32A gradually passes via the transverse direction other side portion 34C of the bag 32 into the waist bag 32B, the kinetic energy of the shoulder portion and the chest portion and the like of the passenger 14 are absorbed by the chest bag 32A. Due thereto, the kinetic energy of the shoulder portion and the chest portion and the like of the passenger 14 can be effectively absorbed, and the shoulder portion and the chest portion and the like of the passenger 14 can be effectively protected.

Further, the vent holes 40 are formed in the waist bag 32B. Therefore, even if gas passes from the interior of the chest bag 32A into the interior of the waist bag 32B, the gas within the waist bag 32B is discharged-out from the vent holes 40, and inflation of the waist bag 32B is suppressed. Due thereto, the transverse direction one side portion 34B and the transverse direction other side portion 34C of the waist bag 32B being inflated and expanded from the thickness direction other side (the passenger 14 side) of the webbing 18 toward the thickness direction one side (the side opposite the passenger 14) can be suppressed, and deterioration of the performance of restraining the waist region of the passenger 14 by the lap webbing 18B can be suppressed.

Moreover, the maximum width dimension of the tube 42 is larger than the diameter dimension of the largest vent holes 40 of the bag 32. Therefore, gas from the inflator 44 can be effectively supplied via the tube 42 interior into the chest bag 32A interior. Moreover, the inflated amount due to the supplying of the gas to the interior of the tube 42 can be made to be large, and the transverse direction other side portion 34C of the bag 32 can be crushed effectively between the tube 42 and the lower side peripheral surface 28B of the insert-through hole 28 of the tongue 26, and the gas within the chest bag 32A passing via the transverse direction other side portion 34C of the bag 32 into the waist bag 32B can be effectively limited (suppressed). Due thereto, the chest bag 32A can be inflated and expanded at an even earlier stage, the shoulder portion and the chest portion and the like of the passenger 14 can be received by the chest bag 32A at an even earlier stage, and the performance of restraining the shoulder portion and the chest portion and the like of the passenger 14 by the chest bag 32A can be improved effectively. Moreover, at the time when the gas from the inflator 44 is supplied into the tube 42, the tube 42 being moved within the bag 32 due to the pressure of the gas and being discharged-out from the vent holes 40 can be suppressed.

Further, the joining strength of the stitched portion 48B, that is at the waist bag 32B position, of the cover 46 is higher than that of the stitched portion 48A, that is at the chest bag 32A position, of the cover 46. Therefore, even if gas passes from the interior of the chest bag 32A to the interior of the waist bag 32B, and the waist bag 32B is inflated, rupturing of the stitched portion 48B, that is at the waist bag 32B position, of the cover 46 is limited (suppressed). Due thereto, the transverse direction one side portion 34B and the transverse direction other side portion 34C of the waist bag 32B being inflated and expanded from the thickness direction other side (the passenger 14 side) of the webbing 18 toward the thickness direction one side (the side opposite the passenger 14) can be effectively limited (suppressed), and deterioration of the performance of restraining the waist region of the passenger 14 by the lap webbing 18B can be suppressed effectively.

Note that, in the present embodiment, the bag 32 (the transverse direction central portion 34A) is disposed at the thickness direction one side of the webbing 18, and the bag 32 is configured to inflate and expand at the thickness direction one side of the webbing 18. However, the bag 32 (e.g., the transverse direction central portion 34A) may be disposed at the thickness direction other side of the webbing 18, and the bag 32 may be configured to inflate and expand at the thickness direction other side of the webbing 18. Moreover, the bag 32 may be disposed at the interior (the thickness direction intermediate portion) of the webbing 18, and the bag 32 may be configured to inflate and expand at the interior (the thickness direction intermediate portion) of the webbing 18. Furthermore, the bag 32 may be disposed at the length direction intermediate portion of the webbing 18 (between the length direction base end side portion and the length direction distal end side portion of the webbing 18), and the bag 32 may be configured to inflate and expand at the length direction intermediate portion of the webbing 18 (between the length direction base end side portion and the length direction distal end side portion of the webbing 18).

Moreover, in the present embodiment, the tube 42 (the supplying portion) is disposed within the bag 32 (the inflating portion). However, the tube 42 (the supplying portion) may be disposed at the exterior of the bag 32 (the inflating portion). Moreover, the tube 42 may be formed at a portion of the bag 32, and the non-tube 42 portion of the bag 32 may be made to be the inflating portion, and the tube 42 portion of the bag 32 may be made to be the supplying portion.

Further, in the present embodiment, the bag 32 and the tube 42 are inserted-through the insert-through hole 28 of the tongue 26 (the insert-through member). However, the bag 32 and the tube 42 may be inserted-through the insert-through hole 22A of the shoulder anchor 22 (the insert-through member).

The disclosure of Japanese Patent Application No. 2014-115152 that was filed on Jun. 3, 2014 is, in its entirety, incorporated by reference into the present specification.

EXPLANATION OF REFERENCE NUMERALS 10 seatbelt device (webbing device)
14 passenger
18 webbing
26 tongue (insert-through member)
28 insert-through hole
28A upper side peripheral surface (one side peripheral surface)
28B lower side peripheral surface (other side peripheral surface)
32 bag (bag body, inflating portion)
40 vent hole (discharge hole)
42 tube (bag body, supplying portion)
46 cover (covering member)

The invention claimed is:

1. A webbing device comprising:
a bag body that is provided at a webbing that is applied to a passenger of a vehicle, and at which are provided a supplying portion into which a fluid is supplied and an inflating portion into which the fluid, that was supplied into the supplying portion, is supplied and that is inflated; and
an insert-through member, in which is provided an insert-through hole through which the bag body is inserted, wherein
the bag body is disposed at one side and at another side of the insert-through member,
the insert-through member supports the bag body at one side peripheral surface of the through-hole,
the fluid, that has been supplied into the supplying portion, is supplied into the inflating portion at the one side of the insert-through member, and
due to the fluid being supplied into the supplying portion and the supplying portion being inflated, the inflating portion is crushed between the supplying portion and another side peripheral surface of the insert-through hole, and passage of the fluid, that is within the inflating portion, from the one side toward the other side of the insert-through member, is limited.

2. The webbing device of claim 1, wherein the supplying portion is configured to contract after supplying of fluid into the supplying portion has ended.

3. The webbing device of claim 1, wherein the supplying portion is disposed at another side of the webbing, and the inflating portion is disposed at one side of the webbing and another side of the supplying portion.

4. The webbing device of claim 1, comprising a discharge hole that is provided at the inflating portion at the other side of the insert-through member, and that is configured to discharge fluid that is within the inflating portion.

5. The webbing device of claim 4, wherein a webbing transverse direction dimension of the supplying portion is larger than a webbing transverse direction dimension of the discharge hole.

6. The webbing device of claim 1, comprising a covering member that covers the bag body, and at which rupturing due to inflation of the bag body is limited at the other side of the insert-through member.

* * * * *